United States Patent
Weninger et al.

(10) Patent No.: US 12,542,130 B2
(45) Date of Patent: Feb. 3, 2026

(54) SYSTEM AND METHOD FOR DYNAMICALLY ADJUSTING SPEECH PROCESSING NEURAL NETWORKS

(71) Applicant: Microsoft Technology Licensing, LLC, Redmond, WA (US)

(72) Inventors: Felix Weninger, Wellesley, MA (US); Marco Gaudesi, Turin (IT); Puming Zhan, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 319 days.

(21) Appl. No.: 18/298,488

(22) Filed: Apr. 11, 2023

(65) Prior Publication Data

US 2024/0347047 A1    Oct. 17, 2024

(51) Int. Cl.
*G10L 15/16*    (2006.01)
*G10L 15/28*    (2013.01)

(52) U.S. Cl.
CPC .............. *G10L 15/16* (2013.01); *G10L 15/28* (2013.01)

(58) Field of Classification Search
CPC ....... G06F 40/126; G10L 15/16; G10L 15/28; G10L 15/02; G10L 15/063; G10L 15/083; G10L 15/197; G10L 15/20; G10L 15/22; G10L 21/0208; G10L 25/30
See application file for complete search history.

(56) References Cited

U.S. PATENT DOCUMENTS

| | | | |
|---|---|---|---|
| 2016/0099010 A1* | 4/2016 | Sainath | G10L 15/16 704/232 |
| 2016/0255131 A1* | 9/2016 | Bulava | H04L 65/70 709/219 |
| 2018/0047389 A1* | 2/2018 | Song | G10L 15/16 |
| 2018/0225660 A1 | 8/2018 | Chapman | |
| 2020/0135227 A1* | 4/2020 | Sainath | G06N 3/045 |
| 2020/0327282 A1* | 10/2020 | Ramarao | G06F 40/274 |
| 2024/0347042 A1 | 10/2024 | Weninger | |

OTHER PUBLICATIONS

Chen, et al., "Developing Real-Time Streaming Transformer Transducer for Speech Recognition on Large-Scale Dataset", In Proceedings of International Conference on Acoustics, Speech and Signal Processing, Jun. 6, 2021, pp. 5904-5908.
Kim, et al., "Multi-mode Transformer Transducer with Stochastic Future Context", In Proceedings of INTERSPEECH, Aug. 30, 2021, pp. 1827-1831.
Han, et al., "ContextNet: Improving Convolutional Neural Networks for Automatic Speech Recognition with Global Context", arXiv:2005.03191, May 16, 2020, 5 pages.
(Continued)

*Primary Examiner* — Abdelali Serrou
(74) *Attorney, Agent, or Firm* — Workman Nydegger (57) ABSTRACT

A method, computer program product, and computing system for dividing a speech signal into a plurality of chunks. A context window is defined for processing a chunk of the plurality of chunks using a neural network of a speech processing system. A processing load associated with the speech processing system is determined. The context window is dynamically adjusted based upon, at least in part, the processing load associated with the speech processing system.

10 Claims, 7 Drawing Sheets

(56) References Cited

OTHER PUBLICATIONS

International Search Report and Written Opinion received for PCT Application No. PCT/US2024/022699, Jul. 15, 2024, 15 pages.
International Search Report and Written Opinion received for PCT Application No. PCT/US2024/022700 May 29, 2024, 12 pages.
Macoskey, et al., "Amortized Neural Networks for Low-Latency Speech Recognition," arXiv preprint, Aug. 3, 2021, 5 Pages.
Sukhbaatar, et al., "Adaptive Attention Span in Transformers", arXiv:1905.07799, May 19, 2019, 5 pages.
Yu, et al., "Dual-mode ASR: Unify and Improve Streaming ASR with Full-context Modeling," International Conference on Learning Representations, Jan. 27, 2021, 13 Pages.
Non-Final Office Action mailed on May 7, 2025, in U.S. Appl. No. 18/298,473, 09 Pages.
Notice of Allowance mailed on Aug. 27, 2025, in U.S. Appl. No. 18/298,473, 08 pages.
International Preliminary Report On Patentability received for PCT Application No. PCT/US2024/022700 Oct. 23, 2025, 06 pages.
International Preliminary Report On Patentability received for PCT Application No. PCT/US2024/022699, Oct. 23, 2025, 12 pages.
U.S. Appl. No. 18/298,473, filed Apr. 11, 2023.
Notice of Allowance mailed on Nov. 4, 2025, in U.S. Appl. No. 18/298,473, 8 Pages.

\* cited by examiner

SYSTEM AND METHOD FOR DYNAMICALLY ADJUSTING SPEECH PROCESSING NEURAL NETWORKS

BACKGROUND

Speech processing has historically been limited by the computing resources of the speech recording device. With the ability to stream speech signals to more powerful computing devices, limitations in speech processing move from speech recording devices to the machine learning models and neural networks used by the larger computing devices. For example, attention mechanisms within conventional neural networks consume significant amounts of time. By limiting attention, computing cost and latency are reduced while reducing accuracy. Conventional approaches use multiple neural networks to account for various constraints that balance latency and accuracy. However, the process of training and switching between multiple neural networks at run-time introduces significant processing inefficiencies.

BRIEF DESCRIPTION OF THE DRAWINGS

Like reference symbols in the various drawings indicate like elements.

DETAILED DESCRIPTION OF THE PREFERRED EMBODIMENTS

As will be discussed in greater detail below, implementations of the present disclosure allow a single neural network or model of a speech processing system to switch between multiple configurations of contextual windows of a speech signal. For example, when processing speech signals, the speech signal is processed in various portions or chunks. Greater chunk sizes and/or more chunks to process results in greater accuracy at the expense of increased latency, while smaller chunk sizes and/or fewer chunks to process results in lower latency at the expense of degraded accuracy. Accordingly, a neural network is trained with various configurations of constraints to account for different use cases (e.g., lower latency, lower accuracy; or increased latency for greater accuracy, etc.). In this manner, implementations of the present disclosure provide more flexible tradeoff between accuracy or latency by dynamically adjusting the contextual windows of a speech signal using predefined configurations at run-time.

The details of one or more implementations are set forth in the accompanying drawings and the description below. Other features and advantages will become apparent from the description, the drawings, and the claims.

The Dynamic Neural Network Process:

Referring to FIGS. 1-7, dynamic neural network process 10 divides 100 a speech signal into a plurality of chunks. A context window is defined 102 for processing a chunk of the plurality of chunks using a neural network of a speech processing system. A processing load associated with the speech processing system is determined 104. The context window is dynamically adjusted 106 based upon, at least in part, the processing load associated with the speech processing system.

Figure 1:
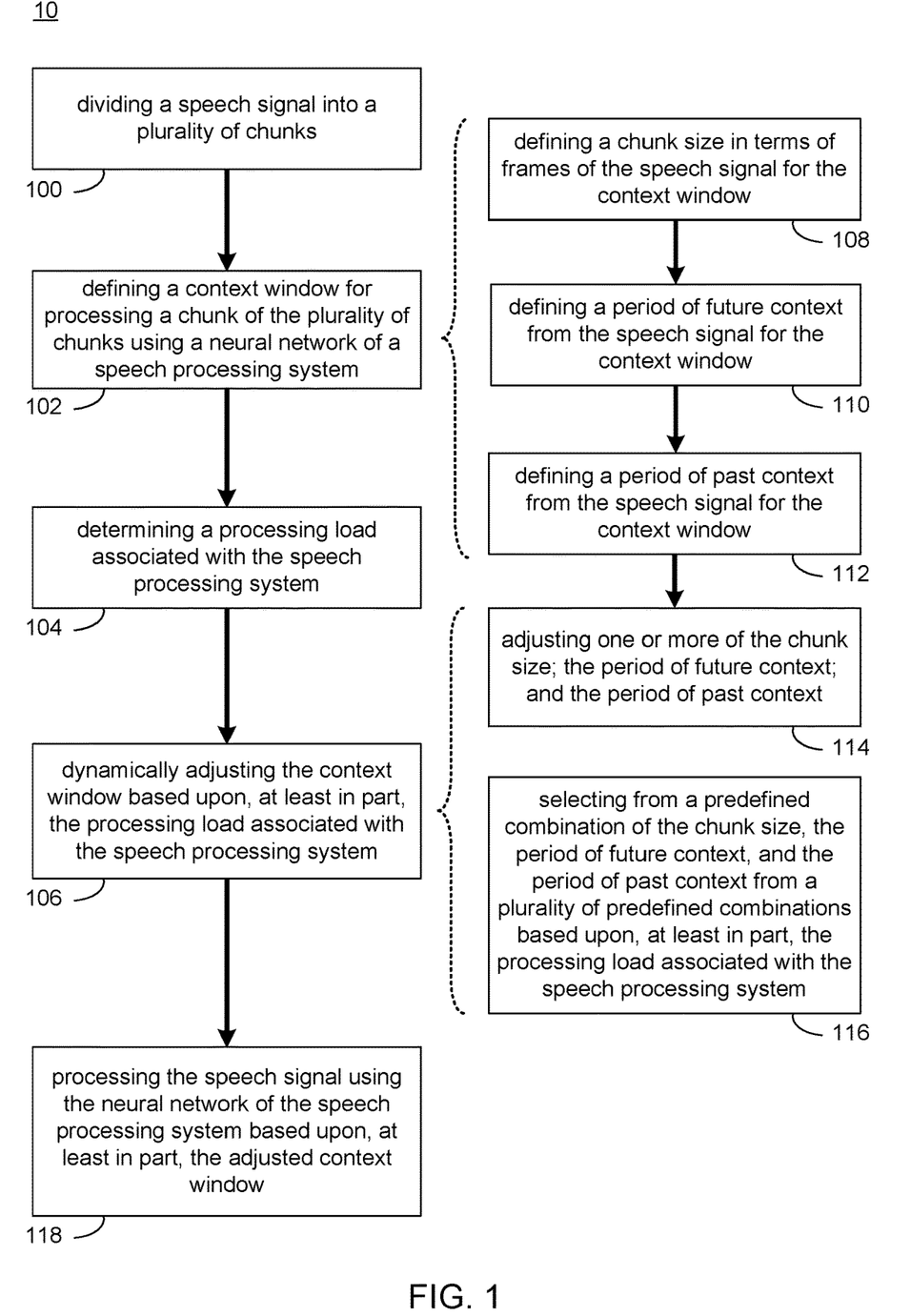
FIG. 1 is a flow chart of one implementation of the dynamic neural network process.

In some implementations, dynamic neural network process 10 divides 100 a speech signal into a plurality of chunks. In some implementations, a speech processing system uses a neural network to process input speech. For example, suppose a speech processing system is an online streaming ASR system that generates a text output for a streamed input speech signal. In this example, the ASR system uses a neural network to perform end-to-end processing of the input speech signal into an output text representation of the speech signal. As will be discussed in greater detail below and in one example, the input speech signal is processed by an online streaming neural network (i.e., a neural network that does not need access to the entire speech signal before starting the recognition process). In this example, the speech signal is processed in portions or chunks as opposed to being processed all at once as in an offline (batch-mode) neural network (i.e., where the speech signal is entirely defined before processing with the neural network). In another example, the speech signal is processed with the entirety of the signal available before processing with the neural network.

For example, a speech processing system includes a neural network for or a model for processing speech input to generate a particular output (e.g., text in the example of ASR, a probability score in the example of a biometric verification system, an enhanced speech signal in the example of a speech enhancement system, and/or an obscured speech signal in the example of a speech filtering system). In some implementations, the speech processing system uses an "End-2-End" model that natively integrates all the needed steps for processing the speech signal.

Figure 2:
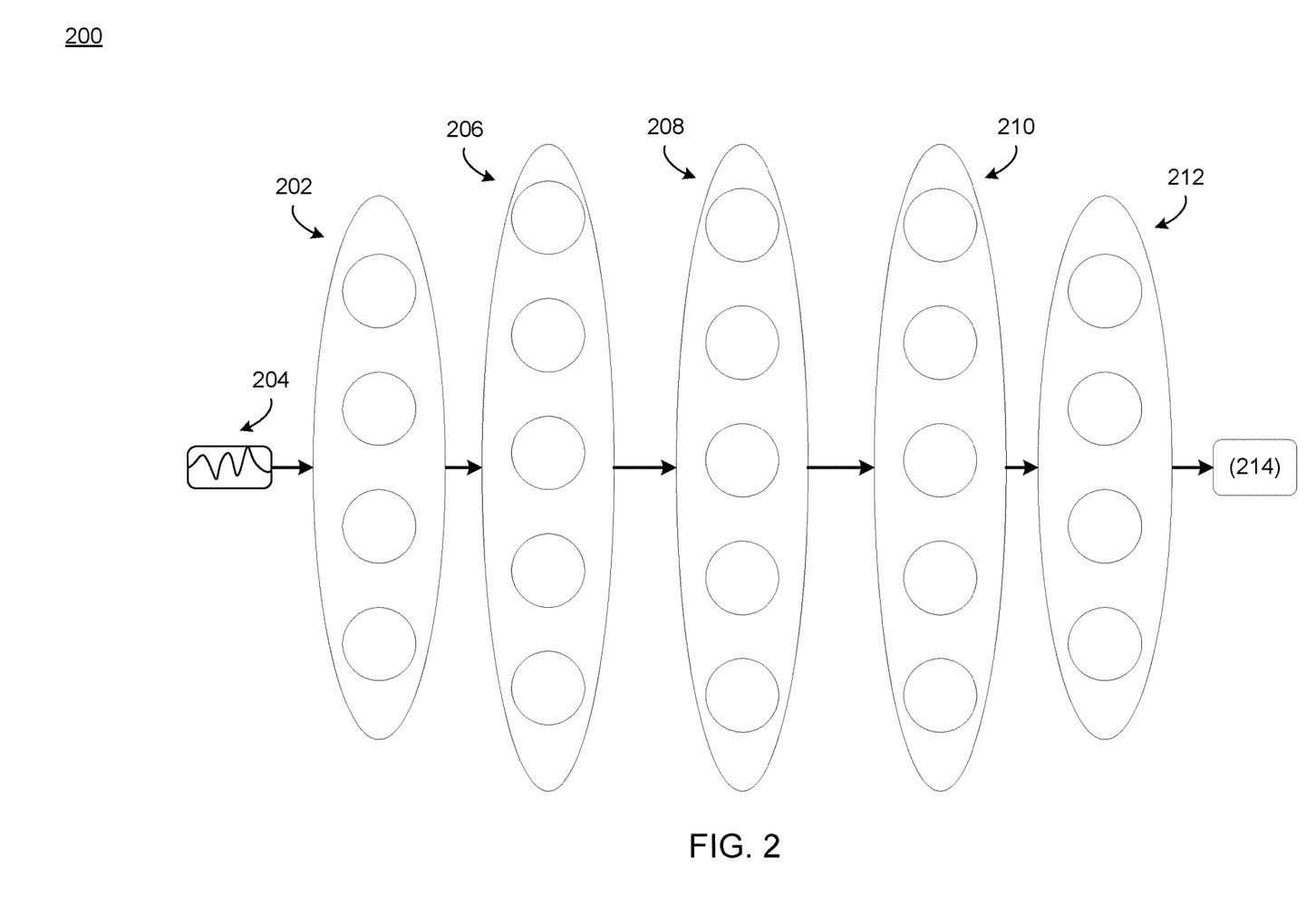
FIG. 2 is a diagrammatic view of a neural network in accordance with one implementation of the dynamic neural network process.

Typically, recurrent neural network transducer (RNN-T) models are used in ASR speech processing systems. A RNN-T model is composed of three components: the acoustic encoder that receives in input the speech segments to be recognized and generates a corresponding high-level representation; the prediction network that autoregressively incorporates previously emitted symbols into the model; and the joiner, that mixes both acoustic and autoregressive label representations via a monotonic alignment process. In some implementations, neural network 200 is a prediction network that uses the context of past portions or chunks and/or future portions or chunks to process a given chunk of the input speech signal.

Referring also to FIG. 2, neural networks/artificial neural networks (e.g., neural network 200) include an input layer (e.g., input layer 202) that receives input data. In the example of speech processing, input layer 202 receives a speech signal (e.g., speech signal 204) in the time-domain. Neural network 200 includes a plurality of processing layers (e.g., layers 206, 208, 210) between the input layer (e.g., input layer 202) and an output layer (e.g., output layer 212). In some implementations, each layer (e.g., layers 206, 208, 210) is a mathematical function designed to produce an output specific to an intended result. In the example of a RNN-T model, neural network 200 includes an input layer (e.g., input layer 202), a MHSA layer (e.g., MHSA layer 206), a convolutional layer (e.g., convolutional layer 208), additional processing layer(s) (e.g., layer 210), and an output layer (e.g., output layer 212). MHSA layer 206 is a Multi Head Self Attention layer that allows neural network 200 to account for global context information with particular emphasis on past portions of the speech signal by focusing "attention" on more important portions of the speech signal and lessening "attention" on less important portions of the speech signal. Convolutional layer 208 allows neural network 200 to better model local correlations in the speech signal being processed. As will be discussed in greater detail below, neural network 200 is autoregressive model that uses attention mechanisms to generate enhances predictions for speech processing. Neural network 200 is often referred to as a "Conformer".

In some implementations, when processing a speech signal (e.g., speech signal 204) using neural network 200, dynamic neural network process 10 divides 100 speech signal 204 into a plurality of chunks or portions of predefined length or size. For example, speech signal 204 is a time-domain signal composed of a number of time frames or portions with speech content. Each frame represents a duration in the time-domain signal (e.g., ten milliseconds). In the example of a time-domain signal for speech signal 204, dynamic neural network process 10 divides 100 speech signal 204 into a plurality of chunks corresponding to a number of frames of speech signal 204. In one example, dynamic neural network process 10 divides 100 speech signal 204 into chunks representing each frame. In another example, dynamic neural network process 10 divides 100 speech signal 204 into chunks representing a portion of a frame. In yet another example, dynamic neural network process 10 divides 100 speech signal 204 into chunks representing multiple frames. The granularity for dividing 100 speech signal 204 into chunks is a configurable value. In example, the chunking granularity (e.g., one chunk per frame of speech signal 204) is a user-defined value using a user interface. In another example, the chunking granularity is a default value that is automatically adjusted by dynamic neural network process 10.

In some implementations, speech signal 204 includes a number of utterances. An utterance is a spoken word, statement, or vocal sound. In some implementations, speech signal 204 is a single utterance. In this example and as will be discussed in greater detail below, dynamic neural network process 10 defines a plurality of context windows (e.g., a first context window and at least a second context window) for processing the single utterance. In another example, dynamic neural network process 10 defines a separate context window for each speech signal. In this example, dynamic neural network process 10 defines a first context window for a first speech signal and a second context window for a second speech signal. In some implementations, speech signal 204 includes a plurality of utterances (e.g., a first utterance and at least a second utterance). In this example and as will be discussed in greater detail below, dynamic neural network process 10 defines a context window for processing each utterance (e.g., a first context window for processing a first utterance and a second context window for processing a second utterance). Accordingly, dynamic neural network process 10 defines multiple context windows for a single utterance or multiple utterances.

Figure 3A:
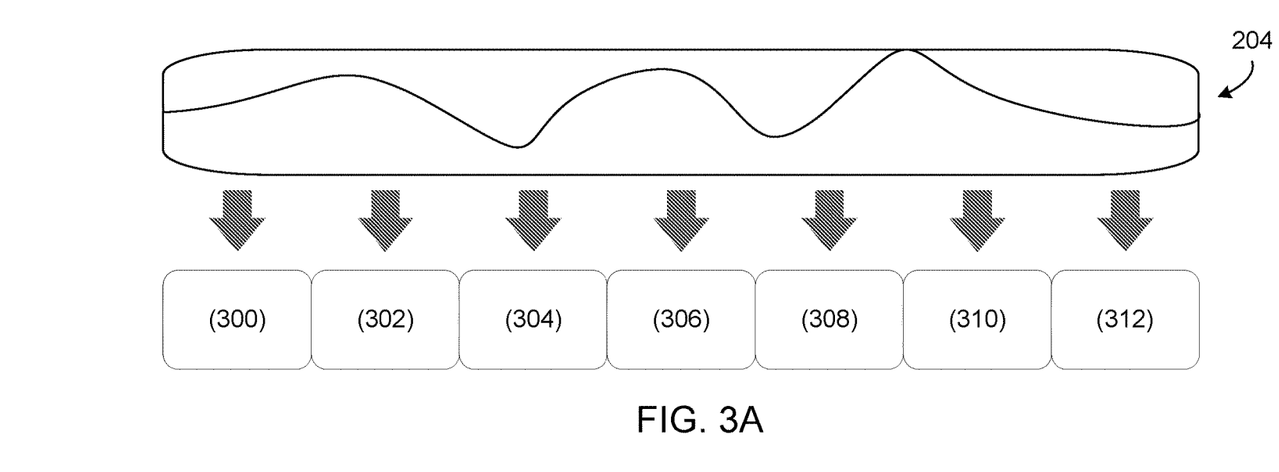
FIGS. 3A-3B are diagrammatic views of the dividing of a speech signal into chunks in accordance with various implementations of the dynamic neural network process.

In some implementations, dynamic neural network process 10 defines 102 a context window for processing a chunk of the plurality of chunks using a neural network of a speech processing system. A context window is the amount of information from the speech signal processed by a neural network at a given time. For example, when processing speech signal 204, suppose dynamic neural network process 10 divides 100 speech signal 204 into a plurality of chunks (e.g., chunks 300, 302, 304, 306, 308, 310, 312) with a chunk size of one frame per chunk. As will be discussed in greater detail below, the chunk size is varied to generate distinct context windows. Dynamic neural network process 10 defines 102 a context window by defining an amount of speech signal 204 to be processed by neural network 200 at a given time. For example, suppose dynamic neural network process 10 is processing chunk 306. Dynamic neural network process 10 defines a context window to be processed with chunk 306. In one example, the context window is the single chunk being processed at a given time. In another example, the context window includes the chunk being processed and a period of past context and/or a period of future context.

In some implementations, defining 102 the context window includes defining a context window for processing a plurality of chunks of a single utterance. For example, suppose speech signal 204 includes a single utterance. In this example, dynamic neural network process 10 defines 102 a context window for the utterance.

Figure 3B:
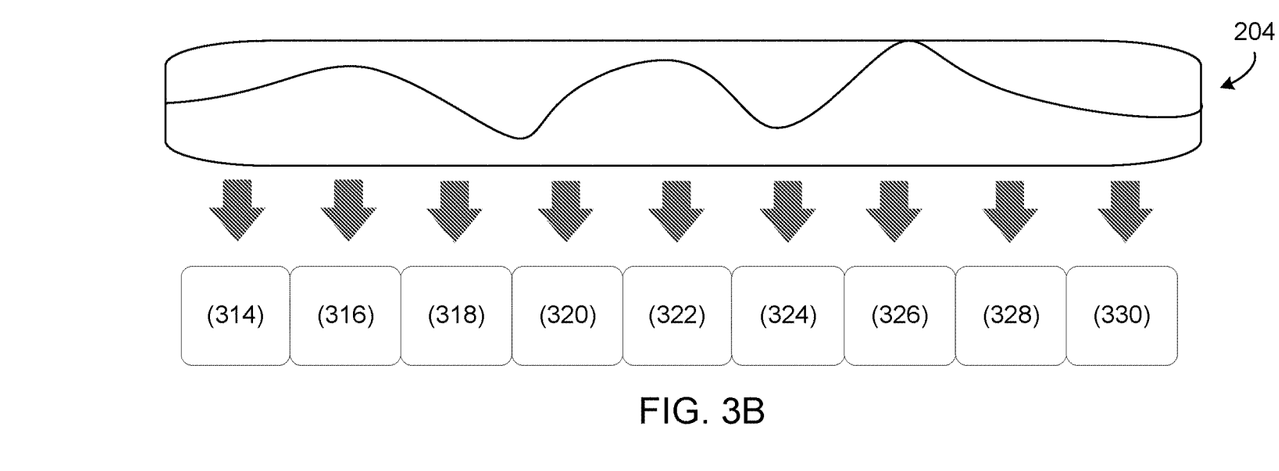

In some implementations, defining 102 the context window includes defining 108 a chunk size in terms of frames of the speech signal for the context window. For example, when processing speech signal 204, suppose dynamic neural network process 10 divides 100 speech signal 204 into a plurality of chunks (e.g., chunks 300, 302, 304, 306, 308, 310, 312). In this example, the chunk size is one frame per chunk. In another example, dynamic neural network process 10 divides 100 speech signal 204 into a plurality of chunks (e.g., chunks 314, 316, 318, 320, 322, 324, 326, 328, 330) representing a chunk size of less than one frame (e.g., 0.5 frames per chunk). As processing each chunk requires computing resources, the more frames per chunk results in fewer, less granular chunks to process. By contrast, fewer frames per chunk results in more granular chunks to process. In some implementations, the chunk size is a duration of time. For example, in FIG. 3A, dynamic neural network process 10 divides 100 speech signal 204 into e.g., one second chunks (e.g., chunks 300, 302, 304, 306, 308, 310, 312). In another example and as shown in FIG. 3B, dynamic neural network process 10 divides 100 speech signal 204 into e.g., half-second chunks (e.g., 314, 316, 318, 320, 322, 324, 326, 328, 330).

In some implementations, defining 102 the context window includes defining 110 a period of future context from the speech signal for the context window. A period of future context is an amount of time (e.g., in terms of time, frames, or chunks) that follows (e.g., comes after in time) a particular chunk. For example and referring also to FIG. 4A, suppose chunk 306 is a chunk being processed at a given time (e.g., represented by the arrow over chunk 306). In this example, dynamic neural network process 10 defines a window (e.g., context window 400) to include a period of future context (e.g., chunk 308). In this example, context window 400 includes a period of future context represented by one chunk. In some implementations, the period of future context is limited by the configuration of the neural network.

Figure 4A:
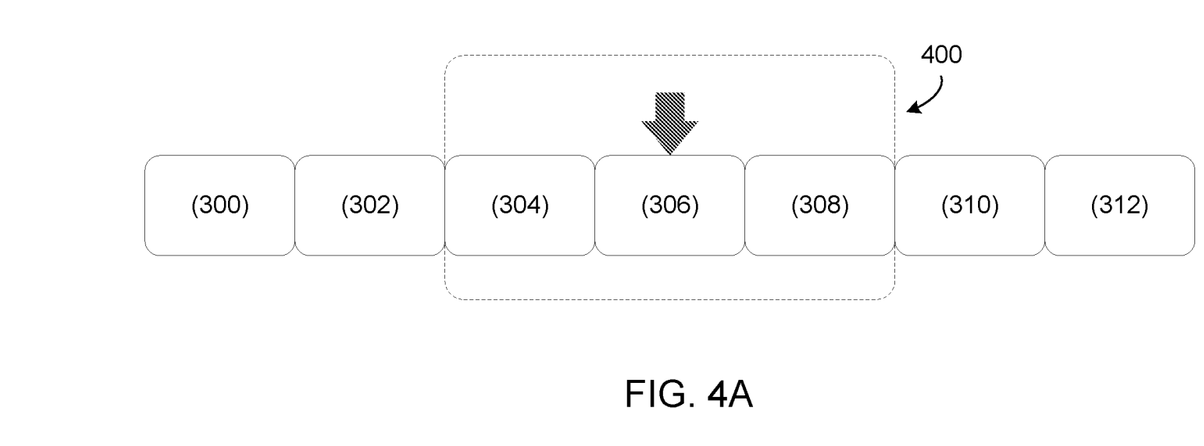
FIGS. 4A-4B are diagrammatic views of various context windows with different chunks sizes in accordance with various implementations of the dynamic neural network process.
Figure 4B:
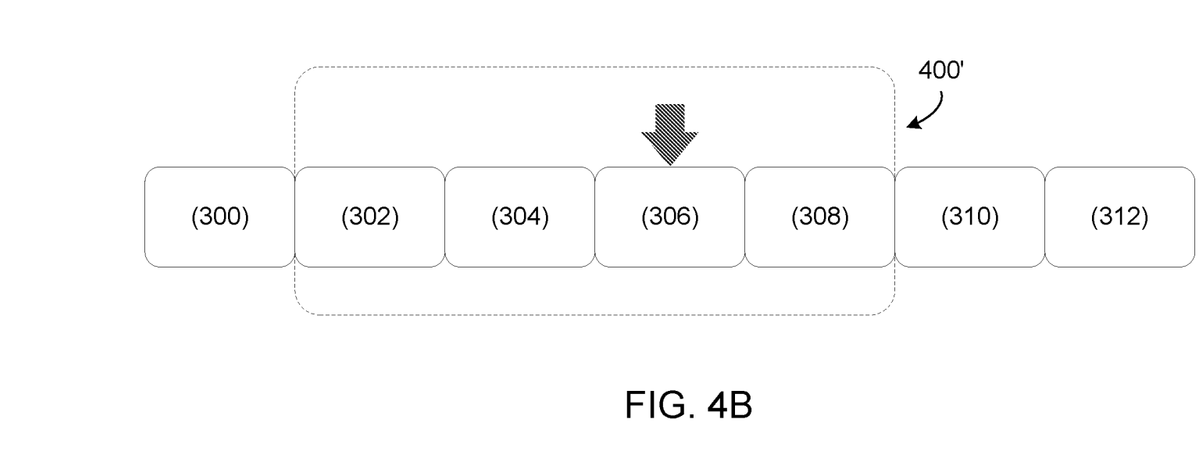

For example, suppose speech signal 204 is being processed at run-time in an online speech processing system where speech signal 204 is received and processed in real time. In this example, dynamic neural network process 10 does not have access to future context (e.g., chunks 308, 310, 312) at the time of the processing of chunk 306. In another example, context window 400' includes a period of future context from speech signal 204 defined as an amount of time following chunk 306.

In some implementations, dynamic neural network process 10 buffers a period of future context before processing chunks in the speech signal. For example, suppose dynamic neural network process 10 buffers two chunks before processing a particular chunk. In the example of FIG. 4A, dynamic neural network process 10 buffers chunks 306, 308, 310 before processing chunk 306. In this example, context window 400 includes a period of future context represented by one chunk. In the example of an offline speech processing system (e.g., where the speech signal is defined in its entirety before processing), the period of future context is not constrained by limitations in processing. Accordingly, dynamic neural network process 10 defines 110 window 400 to include any period of future context in the example of an offline speech processing system.

In some implementations, defining 102 the context window includes defining 112 a period of past context from the speech signal for the context window. A period of past context is an amount of time (e.g., in terms of time, frames, or chunks) that precedes (e.g., comes before in time) a particular chunk. For example and referring also to FIG. 4B, suppose chunk 306 is a chunk being processed at a given time (e.g., represented by the arrow over chunk 306). In this example, dynamic neural network process 10 defines a window (e.g., context window 400') to include a period of past context (e.g., chunks 302, 304). In this example, context window 400' includes two past chunks. As past chunks 302, 304 provide context for processing chunk 306, dynamic neural network process 10 defines 112 window 400' to include a period of past context to enhance the processing of a given or current chunk. In another example, context window 400' includes a period of past context from speech signal 204 defined as an amount of time prior to chunk 306.

Figure 5A:
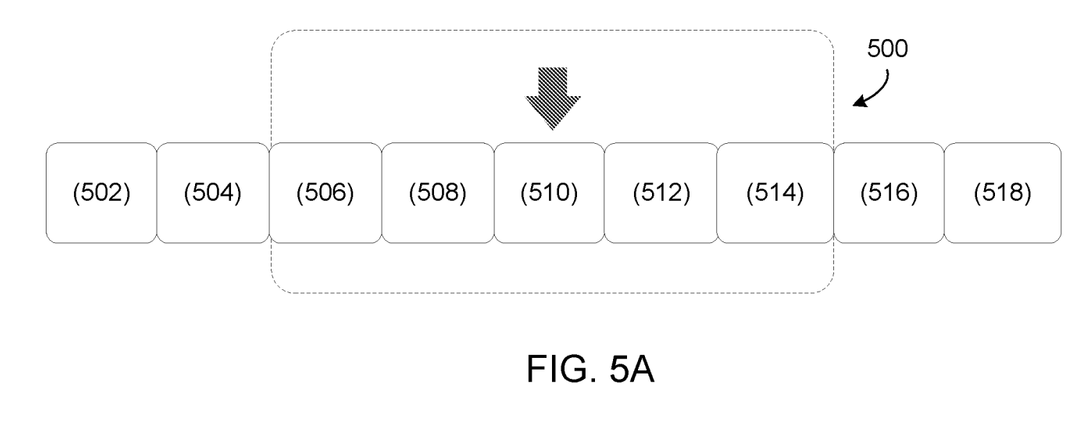
FIGS. 5A-5B are diagrammatic views of the adjustment of previous context windows in accordance with various implementations of the dynamic neural network process.

As discussed above and in some implementations, defining 102 the context window includes defining the context window for processing a plurality of chunks of a first utterance. For example, suppose dynamic neural network process 10 receives and divides 100 two utterances into a plurality of chunks. In this example and as shown in FIG. 3A, dynamic neural network process 10 divides 100 speech signal 204 (e.g., the first utterance) into e.g., one second chunks (e.g., chunks 300, 302, 304, 306, 308, 310, 312). Dynamic neural network process 10 defines the context window (e.g., context window 400) for the first utterance. As will be described in greater detail below, dynamic neural network process 10 defines a context window for a plurality of chunks for a second utterance as shown in FIG. 5A where a second utterance is divided into e.g., half-second chunks (e.g., chunks 502, 504, 506, 508, 510, 512, 514, 516, 518) by adjusting 106 the context window used for the first utterance.

In some implementations, dynamic neural network process 10 determines 104 a processing load associated with the speech processing system. A processing load is numerical representation of the performance of a software component. Examples of numerical representations of a processing load include latency, memory usage, central processing unit (CPU) usage, and/or bandwidth consumption. In some implementations, dynamic neural network process 10 monitors a processing load associated with a speech processing system at predefined intervals. In one example, dynamic neural network process 10 determines 104 or measures a processing load associated with a speech processing system periodically according to a user-defined or default interval.

In some implementations, dynamic neural network process 10 dynamically adjusts 106 the context window based upon, at least in part, the processing load associated with the speech processing system. For example, dynamic neural network process 10 compares a determined processing load against one or more thresholds to determine whether or not to adjust the context window. The one or more thresholds are user-defined or default values indicative of a change in processing load for which the configuration of a neural network (e.g., context window processed) is adjusted. As discussed above, depending upon the amount of data in context window 400, various computing resources are used to process speech signals with neural network 200. In some implementations, when speech processing systems experience changes in processing loads, efficiencies may be realized by adjusting the neural network processing the speech signals. However, there is considerable cost (e.g., in terms of training time and memory usage) to maintaining multiple trained neural networks to switch between at run-time. Accordingly, dynamic neural network process 10 trains neural network 200 to account for multiple configurations in the context window to enhance a single neural network. In this manner, the benefits of adjusting the neural network are realized at run-time without switching between multiple, independent neural networks by using another set of context windows for which the neural network is trained.

Figure 5B:
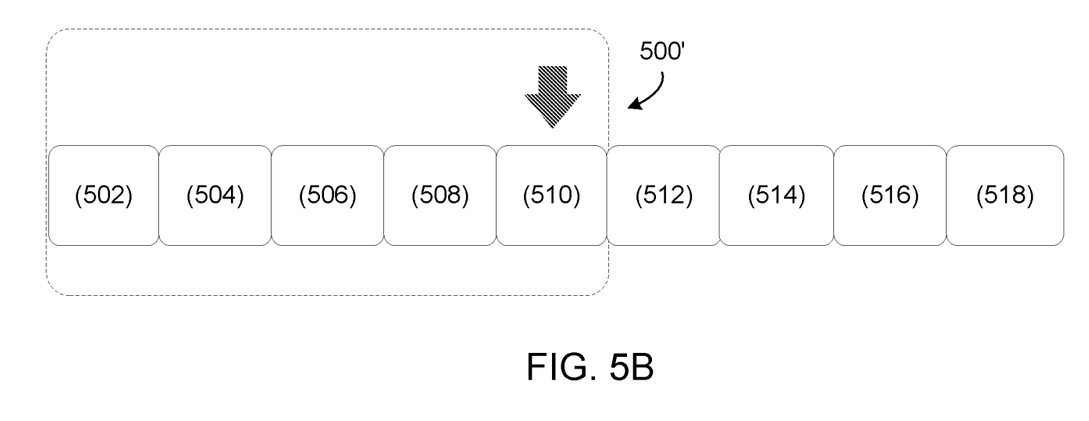

In some implementations, dynamically adjusting 106 the context window includes adjusting 114 one or more of: the chunk size; the period of future context; and the period of past context. Referring also to FIGS. 5A-5B and in some implementations, dynamic neural network process 10 defines an adjusted context window (e.g., adjusted context window 500 in FIG. 5A and adjusted context window 500' in FIG. 5B) by adjusting 116 the chunk size, the period of future context, and/or the period of past context from context window 400 or context window 400'. Suppose that context window 400 includes a chunk size of one second, a period of future context of one chunk, and a period of past context of one chunk. In this example, dynamic neural network process 10 adjusts 116 one or more of the chunk size, the period of future context, and the period of past context. For example, the adjustments to each parameter of context window 400 (e.g., chunk size, period of future context, and period of past context) is user-defined. In this example, a user provides (e.g., using a user interface) a selection of changes to any of the parameters of context window 400.

As shown in FIG. 5A, suppose dynamic neural network process 10 determines that the processing load is decreasing. In this example, dynamic neural network process 10 dynamically adjusts 106 context window 500 by adjusting 114 the chunk size to a reduced chunk size (e.g., 0.5 seconds) (e.g., thus defining chunks 502, 504, 506, 508, 510, 512, 514, 516, 518); by adjusting 114 the period of future context to two chunks (e.g., chunks 512, 514); and by adjusting 114 the period of past context to two chunks (e.g., chunks 506, 508).

As shown in FIG. 5B, suppose dynamic neural network process 10 determines that the processing load is decreasing. In this example, dynamic neural network process 10 dynamically adjusts 106 context window 500' by adjusting 114 the chunk size of context window 400' to a reduced chunk size (e.g., 0.5 seconds); by adjusting 114 the period of future context to zero chunks; and by adjusting 114 the period of past context to four chunks (e.g., chunks 502, 504, 506, 508).

In some implementations, dynamically adjusting 106 the context window includes selecting 116 from a predefined combination of the chunk size, the period of future context, and the period of past context from a plurality of predefined combinations based upon, at least in part, the processing load associated with the speech processing system. For example, dynamic neural network process 10 trains 108 a neural network with multiple configurations of context windows (e.g., context window 400, context window 500) to account for various tradeoffs between accuracy and latency. In some implementations, dynamic neural network process 10 selects a particular context window from the plurality of predefined combinations of chunk sizes, future context, and past context for use in processing speech signals at run-time. In this manner, a single neural network can be adapted using predefined combinations of chunk sizes, future context, and past context to provide a variable tradeoff between accuracy and latency.

Figure 6:
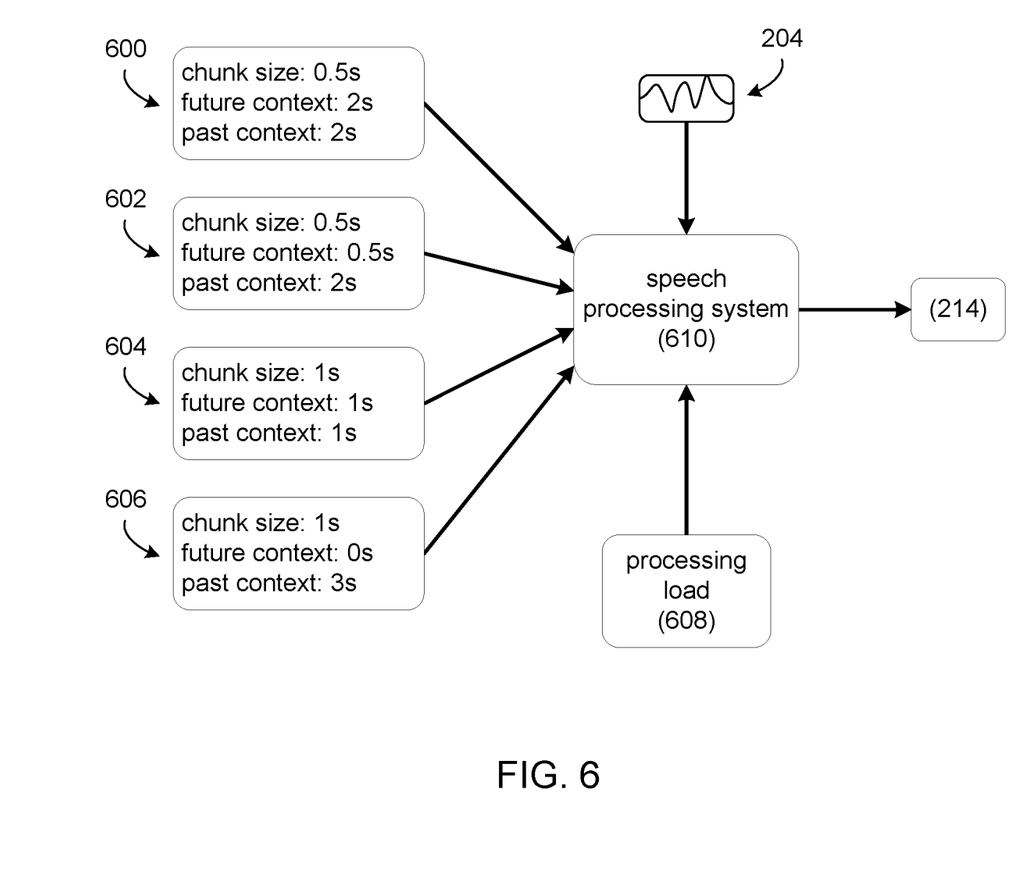
FIG. 6 is a diagrammatic view of the selection of various context windows of a neural network in accordance with one implementation of the dynamic neural network process and FIG. 7 is a diagrammatic view of a computer system and the dynamic neural network process coupled to a distributed computing network.

Referring also to FIG. 6 and in some implementations, suppose dynamic neural network process 10 defines 102 and trains neural network 200 using a plurality of predefined combinations of chunk size, period of future context, and period of past context (e.g., windows 600, 602, 604, 606). In this example, context window 600 defines a chunk size of 0.5 seconds, two seconds of future context, and two seconds of past context; context window 602 defines a chunk size of 0.5 seconds, 0.5 seconds of future context, and two seconds of past context; context window 604 defines a chunk size of one second, one second of future context, and one second of past context; and context window 606 defines a chunk size of one second, no future context, and three seconds of past context. Dynamic neural network process 10 determines 104 the processing load (e.g., processing load 608) for the speech processing system (e.g., speech processing system 610) and dynamically adjusts 106 the context window by selecting 116 one of context window 600, 602, 604, 606 based upon, at least in part, processing load 608.

In some implementations, dynamic neural network process 10 processes 118 the speech signal using the neural network of the speech processing system based upon, at least in part, the adjusted context window. For example, suppose a speech processing system is being used to process speech signals at run-time. With each speech signal, dynamic neural network process 10 uses the trained neural network (e.g., neural network 200 trained with context window 600, 602, 604, 606) to process speech signals. In this example, dynamic neural network process 10 is able to switch between context windows to account for different accuracy/latency tradeoffs. For example, suppose that at one point in time, the speech processing system is experiencing relatively limited processing loads (e.g., compared to average or normal processing loads). In this example with greater processing resource availability (i.e., lower processing load), a context window (e.g., context window 600) with smaller chunk size is selected.

Now, suppose that the processing load experienced by speech processing system changes (i.e., increased processing load). In this example, dynamic neural network process 10 selects a context window with increased chunk size, less future context, and/or less past context (e.g., to decrease latency). Accordingly, dynamic neural network process 10 is able to select from different context windows when processing speech signals. In this manner, the performance of speech processing system is improved by dynamically adjusting to changes in processing loads experienced by the speech processing system.

System Overview

Figure 7:
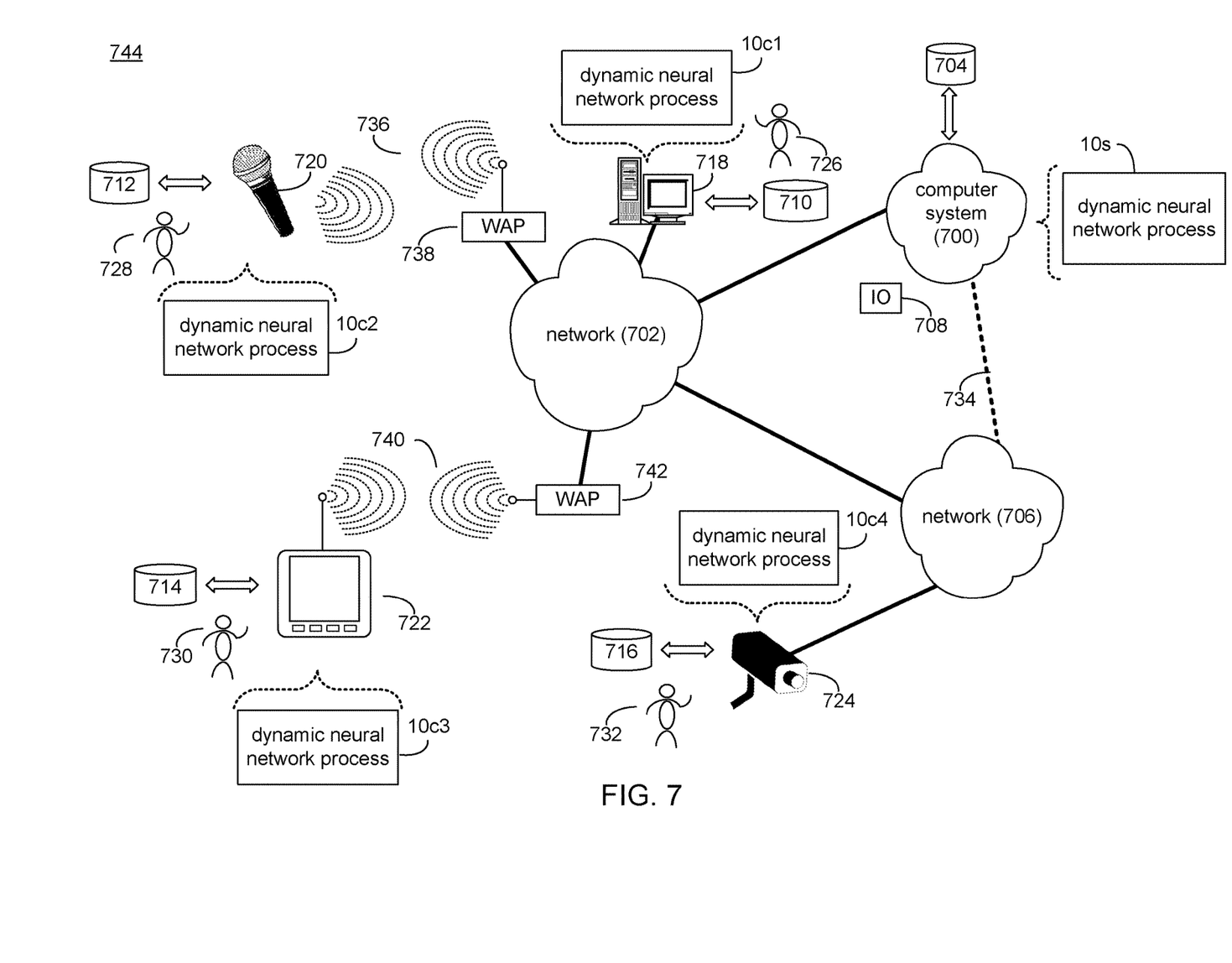

Referring to FIG. 7, there is shown dynamic neural network process 10. Dynamic neural network process 10 may be implemented as a server-side process, a client-side process, or a hybrid server-side/client-side process. For example, dynamic neural network process 10 may be implemented as a purely server-side process via dynamic neural network process 10*s*. Alternatively, dynamic neural network process 10 may be implemented as a purely client-side process via one or more of dynamic neural network process 10*c*1, dynamic neural network process 10*c*2, dynamic neural network process 10*c*3, and dynamic neural network process 10*c*4. Alternatively still, dynamic neural network process 10 may be implemented as a hybrid server-side/client-side process via dynamic neural network process 10*s* in combination with one or more of dynamic neural network process 10*c*1, dynamic neural network process 10*c*2, dynamic neural network process 10*c*3, and dynamic neural network process 10*c*4.

Accordingly, dynamic neural network process 10 as used in this disclosure may include any combination of dynamic neural network process 10*s*, dynamic neural network process 10*c*1, dynamic neural network process 10*c*2, dynamic neural network process 10*c*3, and dynamic neural network process 10*c*4.

Dynamic neural network process 10*s* may be a server application and may reside on and may be executed by a computer system 700, which may be connected to network 702 (e.g., the Internet or a local area network). Computer system 700 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 700 may execute one or more operating systems.

The instruction sets and subroutines of dynamic neural network process 10*s*, which may be stored on storage device 704 coupled to computer system 700, may be executed by one or more processors (not shown) and one or more memory architectures (not shown) included within computer system 700. Examples of storage device 704 may include but are not limited to: a hard disk drive; a RAID device; a random access memory (RAM); a read-only memory (ROM); and all forms of flash memory storage devices.

Network 702 may be connected to one or more secondary networks (e.g., network 704), examples of which may include but are not limited to: a local area network; a wide area network; or an intranet, for example.

Various IO requests (e.g., IO request 708) may be sent from dynamic neural network process 10*s*, dynamic neural network process 10*c*1, dynamic neural network process 10*c*2, dynamic neural network process 10*c*3 and/or dynamic neural network process 10*c*4 to computer system 700.

Examples of IO request 708 may include but are not limited to data write requests (i.e., a request that content be written to computer system 700) and data read requests (i.e., a request that content be read from computer system 700).

The instruction sets and subroutines of dynamic neural network process 10c1, dynamic neural network process 10c2, dynamic neural network process 10c3 and/or dynamic neural network process 10c4, which may be stored on storage devices 710, 712, 714, 716 (respectively) coupled to client electronic devices 718, 720, 722, 724 (respectively), may be executed by one or more processors (not shown) and one or more memory architectures (not shown) incorporated into client electronic devices 718, 720, 722, 724 (respectively). Storage devices 710, 712, 714, 716 may include but are not limited to: hard disk drives; optical drives; RAID devices; random access memories (RAM); read-only memories (ROM), and all forms of flash memory storage devices. Examples of client electronic devices 718, 720, 722, 724 may include, but are not limited to, personal computing device 718 (e.g., a smart phone, a personal digital assistant, a laptop computer, a notebook computer, and a desktop computer), audio input device 720 (e.g., a handheld microphone, a lapel microphone, an embedded microphone (such as those embedded within eyeglasses, smart phones, tablet computers and/or watches) and an audio recording device), display device 722 (e.g., a tablet computer, a computer monitor, and a smart television), machine vision input device 724 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 726, 728, 730, 732 may access computer system 700 directly through network 702 or through secondary network 706. Further, computer system 700 may be connected to network 702 through secondary network 706, as illustrated with link line 734.

The various client electronic devices (e.g., client electronic devices 718, 720, 722, 724) may be directly or indirectly coupled to network 702 (or network 706). For example, personal computing device 718 is shown directly coupled to network 702 via a hardwired network connection. Further, machine vision input device 724 is shown directly coupled to network 706 via a hardwired network connection. Audio input device 722 is shown wirelessly coupled to network 702 via wireless communication channel 736 established between audio input device 720 and wireless access point (i.e., WAP) 738, which is shown directly coupled to network 702. WAP 738 may be, for example, an IEEE 802.11a, 802.11b, 802.11g, 802.11n, Wi-Fi, and/or Bluetooth™ device that is capable of establishing wireless communication channel 736 between audio input device 720 and WAP 738. Display device 722 is shown wirelessly coupled to network 702 via wireless communication channel 740 established between display device 722 and WAP 742, which is shown directly coupled to network 702.

The various client electronic devices (e.g., client electronic devices 718, 720, 722, 724) may each execute an operating system, wherein the combination of the various client electronic devices (e.g., client electronic devices 718, 720, 722, 724) and computer system 700 may form modular system 744.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    dividing a speech signal into a plurality of chunks;
    defining a context window for processing a chunk of the plurality of chunks using a neural network of a speech processing system;
    at a first time instance, determining a first processing load associated with the speech processing system;
    performing a first dynamic adjustment to the context window based on the first processing load associated with the speech processing system, wherein the first dynamic adjustment includes an increase to the context window;
    at a second time instance, determining a second processing load associated with the speech processing system, wherein the second processing load is lower than the first processing load;
    performing a second dynamic adjustment to the context window based on the second processing load associated with the speech processing system, wherein the second dynamic adjustment includes, relative to the first dynamic adjustment, a decrease to the context window, and wherein decreasing the context window includes adjusting a period of future context to a first selected number of chunks that is greater than or equal to one and adjusting a period of past context to a second selected number of chunks; and
    processing the speech signal using the neural network of the speech processing system based on the adjusted context window, which is adjusted by the second dynamic adjustment.

2. The computer-implemented method of claim 1, wherein defining the context window includes defining a chunk size in terms of frames of the speech signal for the context window.

3. The computer-implemented method of claim 1, wherein the first or second dynamic adjustment to the context window includes selecting from a predefined combination of the chunk size, the period of future context, and the period of past context from a plurality of predefined combinations based on the first or second processing load associated with the speech processing system.

4. The computer-implemented method of claim 1, further comprising:
    processing the speech signal using the neural network of the speech processing system based on the adjusted context window, which is adjusted by the first dynamic adjustment.

5. A computing system comprising:
    one or more processors; and one or more hardware storage devices that store instructions that are executable by the one or more processors to cause the computing system to:
divide a speech signal into a plurality of chunks;
define a context window for processing a chunk of the plurality of chunks using a neural network of an automated speech recognition (ASR) system;
at a first time instance, determine a first processing load associated with the speech processing system;
perform a first dynamic adjustment to the context window based on the first processing load associated with the speech processing system, wherein the first dynamic adjustment includes an increase or a decrease to the context window;
at a second time instance, determine a second processing load associated with the speech processing system, wherein the second processing load is lower than the first processing load;
perform a second dynamic adjustment to the context window based on the second processing load associated with the speech processing system, wherein the second dynamic adjustment includes, relative to the first dynamic adjustment, a decrease to the context window, and wherein decreasing the context window includes adjusting a period of future context to a first selected number of chunks that is greater than or equal to one and adjusting a period of past context to a second selected number of chunks; and
process the speech signal using the neural network of the ASR system based on the adjusted context window, which is adjusted by the second dynamic adjustment.

6. The computing system of claim 5, wherein defining the context window includes defining a chunk size in terms of frames of the speech signal for the context window.

7. The computing system of claim 5, wherein the first or second dynamic adjustment to the context window includes selecting from a predefined combination of the chunk size, the period of future context, and the period of past context from a plurality of predefined combinations based on the first or second processing load associated with the speech processing system.

8. One or more hardware storage devices that store instructions that are executable by one or more processors to cause the one or more processors to:
divide a speech signal into a plurality of chunks;
define a context window for processing a chunk of the plurality of chunks using a neural network of a speech processing system;
at a first time instance, determine a first processing load associated with the speech processing system;
perform a first dynamic adjustment to the context window based on the first processing load associated with the speech processing system, wherein the first dynamic adjustment includes one of an increase or a decrease to the context window;
process the speech signal using the neural network of the speech processing system based on the adjusted context window, which is adjusted by the first dynamic adjustment;
at a second time instance, determine a second processing load associated with the speech processing system, wherein the second processing load is lower than the first processing load;
perform a second dynamic adjustment to the context window based on the second processing load associated with the speech processing system, wherein the second dynamic adjustment includes, relative to the first dynamic adjustment, a decrease to the context window, and wherein decreasing the context window includes adjusting a period of future context to a first selected number of chunks that is greater than or equal to one and adjusting a period of past context to a second selected number of chunks;
process the speech signal using the neural network of the speech processing system based on the adjusted context window, which is adjusted by the second dynamic adjustment; and
process the speech signal using the neural network of the speech processing system based on the adjusted context window, which is adjusted by the second dynamic adjustment.

9. The one or more hardware storage devices of claim 8, wherein defining the context window includes defining a chunk size in terms of frames of the speech signal for the context window.

10. The computer program product of claim 8, wherein the first or second dynamic adjustment to the context window includes selecting from a predefined combination of the chunk size, the period of future context, and the period of past context from a plurality of predefined combinations based on the first or second processing load associated with the speech processing system.

* * * * *